United States Patent
Bowman (12)

(10) Patent No.: US 6,557,697 B1
(45) Date of Patent: May 6, 2003

(54) AUTOMATIC BELT SKIRT FOR CONVEYOR

(75) Inventor: Houston Bowman, Sacramento, KY (US)

(73) Assignee: Martin Engineering Company, Neponset, IL (US)

(*) Notice: Subject to any disclaimer, the term of this patent is extended or adjusted under 35 U.S.C. 154(b) by 0 days.

(21) Appl. No.: 09/940,028

(22) Filed: Aug. 27, 2001

(51) Int. Cl.$^7$ ................................................ B65G 21/20
(52) U.S. Cl. .......................... 198/836.3; 198/836.2; 198/836.1
(58) Field of Search ................... 198/836.1, 836.2, 198/836.3, 836.4

(56) References Cited

U.S. PATENT DOCUMENTS

| | | | |
|---|---|---|---|
| 2,298,472 A | * 10/1942 | Dudley | 198/836.3 |
| 2,568,434 A | 9/1951 | Dunasky | |
| 2,665,795 A | 1/1954 | Holwick | |
| 2,681,134 A | 6/1954 | White | |
| 2,983,362 A | 5/1961 | Crist, Jr. | |
| 3,024,893 A | 3/1962 | Lambert | |
| 3,253,305 A | 5/1966 | Granath | |
| 3,344,909 A | 10/1967 | Hansen et al. | |
| 3,499,523 A | 3/1970 | Clegg | |
| 3,707,222 A | 12/1972 | Hartley | |
| 3,844,405 A | 10/1974 | Shuford | |
| 4,204,595 A | 5/1980 | Marrs | |
| 4,231,471 A | 11/1980 | Gordon | |
| RE31,249 E | 5/1983 | Stahura | |
| 4,436,446 A | 3/1984 | Gordon | |
| 4,620,629 A | * 11/1986 | Dean | 198/836 |
| 4,641,745 A | 2/1987 | Skates | |
| 4,678,086 A | 7/1987 | Nerrig et al. | |
| 4,756,402 A | * 7/1988 | Bevins | 198/836 |
| 4,874,082 A | 10/1989 | Swinderman | |
| 4,877,125 A | 10/1989 | Gordon | |
| 5,048,669 A | 9/1991 | Swinderman | |
| 5,154,280 A | 10/1992 | Mott | |
| 5,267,642 A | 12/1993 | Gharpurey et al. | |
| 5,303,813 A | 4/1994 | de Rooy | |
| 5,435,689 A | * 7/1995 | Stonehouse | 198/836.3 |
| 5,513,743 A | 5/1996 | Brink | |
| 5,816,388 A | 10/1998 | Bowman | |
| 5,913,404 A | 6/1999 | Bowman | |
| 6,003,662 A | * 12/1999 | McCaffrey et al. | 198/836.3 |
| 6,269,943 B1 | * 8/2001 | Mott | 198/836.1 |
| 6,328,156 B1 | 12/2001 | Ostman | |

FOREIGN PATENT DOCUMENTS

| | | | |
|---|---|---|---|
| DE | 28 52 524 | 6/1980 | |
| EP | 0406425 A1 | 1/1991 | |
| GB | 1256691 | * 12/1971 | 198/836.1 |
| GB | 1 566 549 | 5/1980 | |
| JP | 62-136409 | 6/1987 | |
| JP | 10-67416 | 3/1998 | |
| SU | 967-894 A | * 10/1982 | 198/836.1 |

OTHER PUBLICATIONS

Gordon At–Last–A–Seal System printout, Arch Environmental Equipment, Inc., copyright 2001.
Gordon At–Last–A–Seal Sealing System brochure, pp. 60–61, Arch Environmental Equipment, Inc., believed to have been published prior to Aug. 27, 2000.
Installation Instructions Gordon "At Last A Seal" Skirt Board Seal System brochure, Arch Environmental Equipment, Inc., believed to have been published prior to Aug. 27, 2000.

* cited by examiner

*Primary Examiner*—Douglas Hess
(74) *Attorney, Agent, or Firm*—Lee, Mann, Smith, McWilliams, Sweeney & Ohlson

(57) ABSTRACT

A belt conveyor system using a mechanism that can either create a seal between the skirt and the belt or allow the skirt to make floating contact with the belt regardless of the directional movement of the belt.

21 Claims, 4 Drawing Sheets

AUTOMATIC BELT SKIRT FOR CONVEYOR

BACKGROUND OF THE INVENTION

The present invention relates to side skirts used on belt conveyors that transport free-flowing materials such as coal. A common problem associated with transport of free-flowing materials by belt conveyors is loss of material over the edges of the belt. Belt conveyors are many times "troughed" (upwardly flexed along the edges) to prevent this problem; however, troughing is limited by the flexibility of the belt material and does not completely eliminate spillage from the belt. The side skirt is another mechanism used to prevent the conveyed material from falling off of the edges of the belt.

A side skirt is typically made of rubber or similar flexible material. The skirt is hung over the belt such that its bottom edge meets the top of the belt, thereby creating a seal to further prevent loss of materials over the edges of the belt. In one arrangement, pressure-producing arms positioned at predetermined intervals along the skirt are used to maintain a seal between the belt and the skirt. The arm is a curved blade that rotates about a fixed pivot point. The first end of the arm is held against the top of the skirt. A force is applied to the second end of the pressure arm so that the arm is rotated downwardly, forcing the first end against the top of the skirt. The pressure can be applied by a spring, weight, or other similar device.

Such an arrangement is taught in U.S. Pat. No. 5,913,404, issued on Jun. 22, 1999 to Houston Bowman. However, the arrangement has certain drawbacks. The belt must move in a given direction, for example from left to right, for the pivoting arms to act as pressure arms thereby creating a seal between the skirt and the belt to prevent spillage of conveyed material. If it becomes desirable to move the free-flowing material from right to left, the arms become floating arms and no such seal is created between the skirt and the belt.

Although pressure arms creating a seal between the skirt and the belt are generally preferred, the construction of some belts makes floating contact necessary. For example, some belts are pieced together with metal clamps, creating an abrupt rise and fall of the surface of the belt as it moves. When a pressure skirt is used with such a belt, it can become caught or jammed. It may become advantageous to have a floating skirt, regardless of the directional movement of the belt, to avoid a belt jam.

Thus, depending on the construction of the belt, it becomes desirable to create a skirt that has the ability to form a seal with the belt, or if desired to make floating contact, regardless of the direction in which the conveyed material must be moved.

SUMMARY OF THE INVENTION

The present invention employs a mechanism that can either cause a seal to be created between the skirt and the belt or allow the skirt to make floating contact with the belt regardless of the directional movement of the belt.

A plurality of arms is spaced at predetermined intervals along the length of the side wall of the belt conveyor frame. Each arm has a first end at its top that is pivotally attached to the conveyor frame and a second end at its bottom that is pivotally attached to the skirt. Each arm can be adjusted to at least two different positions. In one position, known as the first configuration, the arm inclines in a first direction. In the other position, known as the second configuration, the arm inclines in a second direction.

When the arms are in the first configuration, as the belt moves in a first direction (from left to right), the friction between the bottom edge of the skirt and the top of the belt, together with the force of gravity pushing the pivoting arms downward, create a seal between the belt and the skirt, keeping the conveyed material from being lost over the edges. In this case the arms can be described as pressure arms. If the belt is moved in the opposite direction (from right to left), the friction between the bottom edge of the skirt and the top edge of the belt, together with the positioning of the arms, keep the skirt from pressing down onto the belt. In this second configuration the skirt makes floating contact with the belt and the arms can be described as floating arms.

When the arms are placed in the second configuration, as the belt moves in the first direction (from left to right), the arms act as floating arms, causing the skirt to make floating contact with the belt. When the belt is moved in the opposite direction (from right to left), the arms act as pressure arms, creating a seal between the skirt and the belt. The multiple points of attachment allow the arms to act as pressure or floating arms thereby permitting a pressure seal or floating contact regardless of the direction the belt moves.

Because the arms rotate about pivotal points of attachment, as the skirt wears it moves downward under the force of gravity, thus maintaining the desired contact with the belt even when it becomes shorter.

DETAILED DESCRIPTION

A typical belt conveyor, commonly used for transporting bulk free-flowing material (e.g. coal, ore, etc.), transports material on a belt constructed of a rubber or similar elastomer and supported by a series of rollers. To minimize spillage or loss of material over the edges of the belt, belt conveyors are many times curved or inclined at the edges in a manner termed "troughing". Troughing, however, is limited by the flexibility of the belt material and does not completely eliminate spillage. Side skirts, typically comprising a flexible, vertically oriented side wall, are often used in tandem with troughed conveyors, to further minimize conveyed material from falling off of the edges of the belt. A side skirt is typically made of rubber or a similar elastomer, and contacts the belt along its upper surface. As the bottom edge of the skirt wears, the skirt moves downwardly under the force of gravity such that the desired contact is maintained.

Prior art skirts have addressed the problem of non-uniform seals between the skirt and the belt that can occur, particularly as the skirts become increasingly worn through use. This is achieved by providing a mechanism that supplies a constant downward force along the entire top edge of the skirt so that it maintains a uniform seal with the belt even after the skirt has experienced wear. As discussed above, however, the belt must move in a given direction, for example from left to right, for the pivoting arms to act as pressure arms thereby creating a seal between the skirt and the belt to prevent spillage of conveyed material. If it becomes desirable to move the free-flowing material in the opposite direction, the arms become floating arms and no such seal is created between the skirt and the belt. Additionally it is sometimes advantageous, because of the nature of the belt, to maintain a floating skirt independent of the directional movement of the belt.

Thus, depending on the construction of the belt, it becomes desirable to create a skirt that has the ability to form a seal with the belt, or in other cases to make floating contact, regardless of the direction in which the conveyed material must be moved. The present invention addresses this problem.

Figure 1:
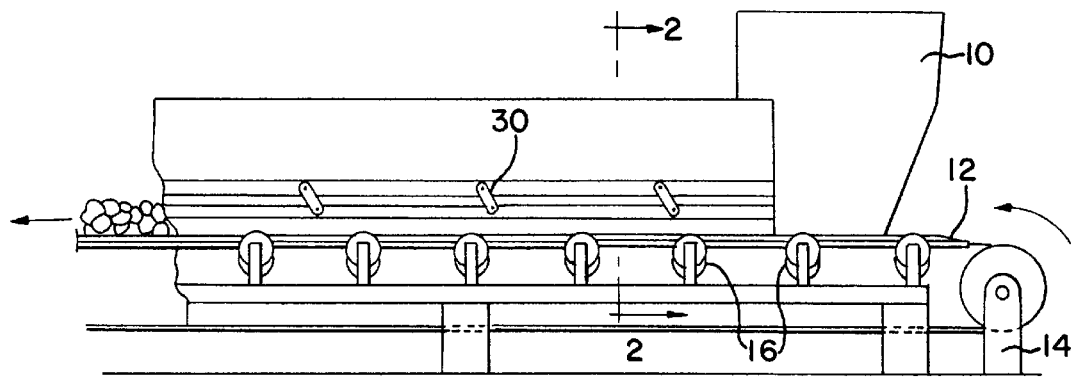
FIG. 1 is a side view of an embodiment of the present invention installed on a typical belt conveyor.
Figure 2:
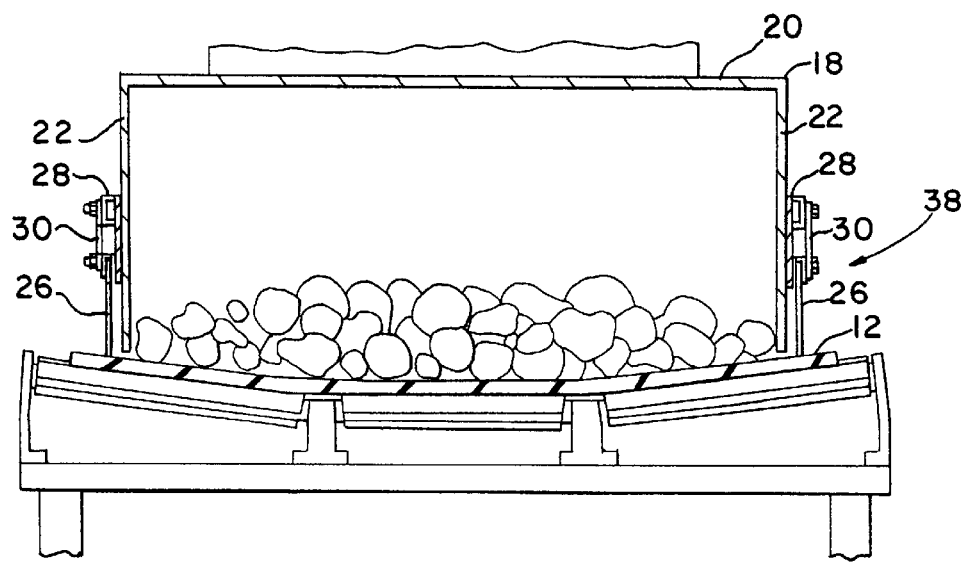
FIG. 2 is a sectional view taken along line 2—2 of FIG. 1.
Figure 3:
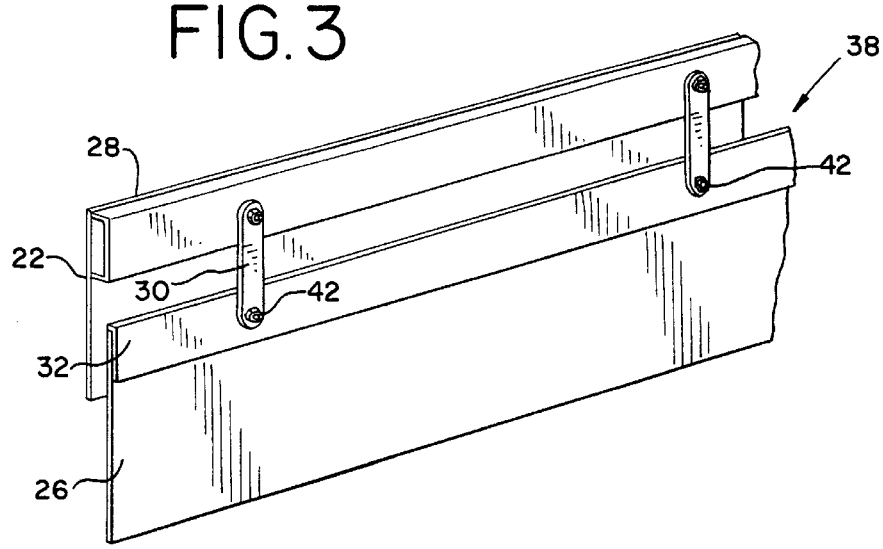
FIG. 3 is a partial perspective view of the conveyor frame, the pivoting arms, and the sealing skirt.

FIGS. 1 and 2 depict generally a belt conveyor assembly implementing the present invention with FIG. 3 illustrating the general perspective view of a skirt assembly. A hopper 10 feeds the bulk free-flowing material onto the upper surface of a belt 12 driven by a drive unit 14 over a series of rollers 16, the rollers 16 being spaced at predetermined intervals to provide support for the belt 12. A frame 18 having a top wall 20 and side walls 22 encompasses the belt 12, essentially along its entire carrying length.

To simply show the nature of the skirt, reference may be made to FIG. 3 where a skirt 26 is depicted as pivotally connected to a side wall of the conveyor frame 22. The specific features of the skirt mechanism 38 in accordance with the present invention, however, are perhaps best seen in the views afforded by FIGS. 4, 5 and 6 in which the mechanism permits, in one position, downward pressure to be provided uniformly supplied along the entire length of the skirt 26 creating a seal between the skirt 26 and the belt 12, and, in a second position, allows the skirt to float over the belt. The skirt mechanism 38, as illustrated, comprises a plurality of spaced arms 30 which are pivotally attached at an upper end at one or the other of a pair of points of attachment 34, 35 on a channel member 28 and a lower end to a spacer member 32. The channel member 28 is welded or otherwise fixed to the side wall 22 of the conveyor frame and may have a length extending the length of the side wall 22. While not shown, it should be understood that a plurality of separate spacer members 28 may be used, each of which fixed to the side wall 22 at predetermined intervals at the points of attachment 34 along the length of the side wall 22. While member 28 is preferred to have a channel-like structure in order to create some space between the side wall 22 of the conveyor frame 18 and the arm 30 and thereby allowing arm 30 to pivot more freely, the first end of the arm 30 can be pivotally connected directly to the side wall 22 for some applications, if desired. The lower or second end of the arm 30 is pivotally connected to a second spacer member 32 and the skirt 26 by a pin or similar device such that the second spacer member 32 is positioned between the arm 30 and the skirt 26. Spacer member 32 may extend the length of the skirt 26 . Use of a spacer member 32 is preferred, not only because it permits free rotation but because it acts as a bushing to limit wear on the skirt 26 at the pivot point. However, the lower end of the arm 30 can be connected directly to the skirt 26.

Figure 4:
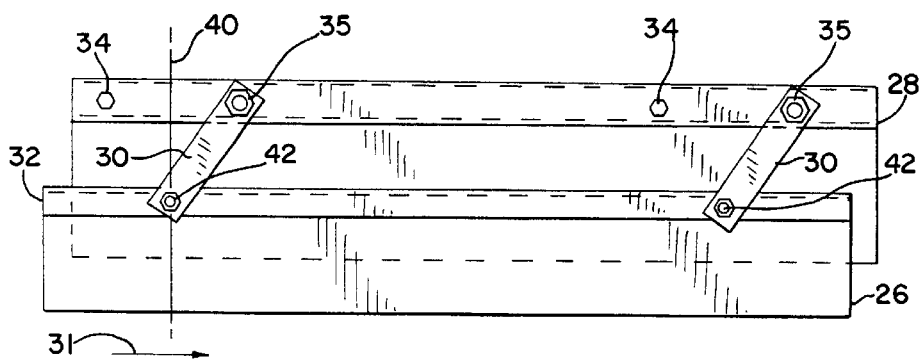
FIG. 4 is a side view of the automatic skirt of the present invention where the arms are attached so that the skirt presses against the conveyor belt.
Figure 5:
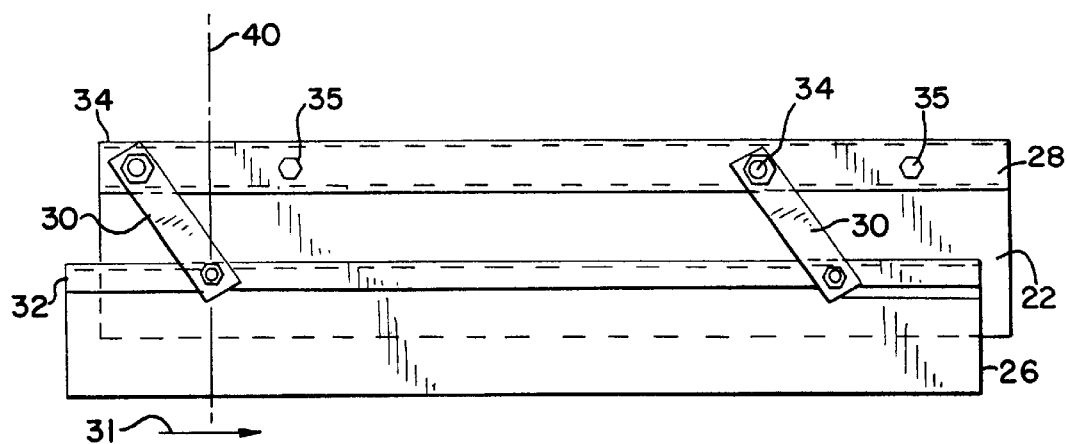
FIG. 5 is a side view of the automatic skirt of the present invention where the arms are attached so that the skirt floats on the conveyor belt.
Figure 6:
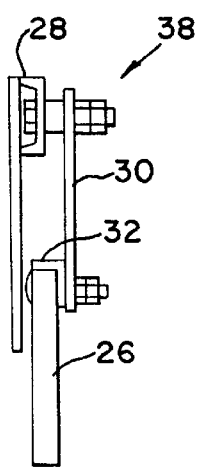
FIG. 6 is an end view of the automatic skirt mechanism illustrated in FIG. 4.

As is clear from the views provided by FIGS. 4 and 5, there are at least two possible points of attachment for the second end of each arm. In either position, the length of the arm and skirt 32 are selected such that the arm 30 is positioned at an angle to a vertical line 40 passing through the pivotal connection point 42 of the lower end of the arm 30. In a first or pressure position, the upper end of the arm 30 is attached to the first attachment point 35, making it incline toward the right as indicated in FIG. 4. In a second or floating position, the second end of the arm 30 is attached to a second attachment point 34, making it incline in toward the left of the vertical line 40 as indicated in FIG. 5. It should be noted that the conveying direction in both FIGS. 4 and 5 is from left to right as indicated by arrow 31. It is also preferable that the vertical line essentially bisect the distance between points 34 and 35. In this manner the angle of inclination will be essentially the same whether the arms are inclined to the right or left.

When the arms 30 are in the first position shown in FIG. 4, the friction between the bottom edge of the skirt 26 and the top of the belt 12, together with the force of gravity pushing the pivoting arms 30 downward to the bottom of the circle of rotation about point 35, thereby creating a tight seal between the belt 12 and the skirt 26, thus keeping the conveyed material from being lost over the edges. In this case, the arms 30 can be described as pressure arms. As the bottom edge of the skirt 26 wears, the arms 30 continue to rotate slightly toward the bottom of the circle about point 35, thus continuing to maintain the tight seal with the underlying belt 12. The angle that each arm 30 makes with the vertical line 40 can be anywhere from 10 to 60 degrees, but is preferred to be 30 degrees initially. When wear causes the skirt 26 to become short enough to hang almost perpendicular to the plane of the belt 12, it can be replaced.

If the motion of the belt should be reversed, i.e., moved from right to left, the skirt, however, would then only be held against the belt by gravity as the frictional force between the skirt and belt urges the arms 30 away from the bottom of the circle about point 35, and the skirt is then said to float as it merely rides on top of the belt. The arms 30 can then be described as floating arms. The present invention, however, provides for the ability to convert the skirt assembly from a pressure skirt to a floating skirt without any change in the conveyor direction by merely moving the point of attachment to that shown in FIG. 5 which duplicates the effect of reversing the conveyor as described above. In this position where the upper ends of arms 30 are attached to points 34, the skirt then only rides on the underlying belt as the belt tends to move the arms in a counter-clockwise motion and away from the bottom of the circle about point 34. On the other hand, should the direction of the belt be changed yet a pressure skirt be desired, the attachment of the upper ends of arms 30 could also be changed so that the arms 30 are urged toward the bottom of the circle about point 35 and thus the bottom edge of skirt 26 into a tight seal with belt 12.

Figure 7:
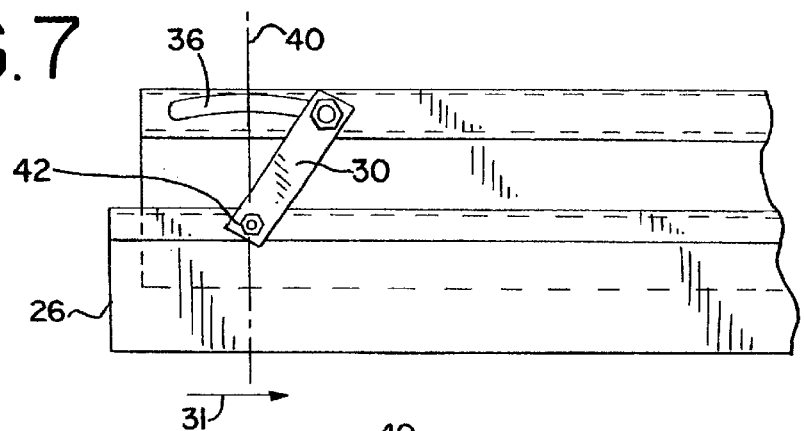
FIGS. 7 and 7A are respective views of another embodiment of the present invention with the arms in the pressure and floating positions.
Figure 7A:
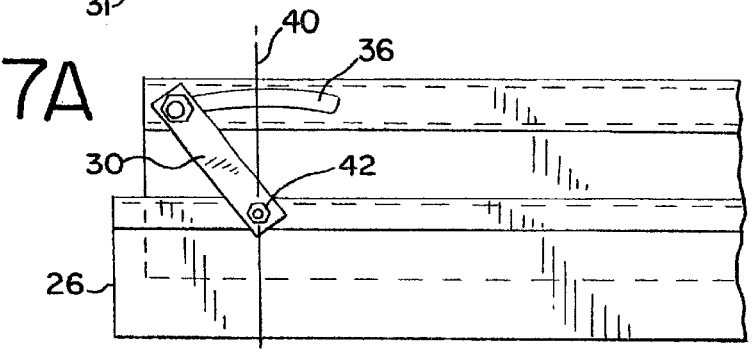

Alternatively, if desired, instead of discrete points of attachment, an arc shaped aperture 36 can be used, as shown in FIGS. 7 and 7A. In this embodiment, the channel member 38 is provided with an aperture 36 having the arc shape and arm 30 is pivotally secured to the channel member 38 at any point along the aperture 36, thus allowing a large variation of initial angles of inclination. As can be seen, it is preferable that the vertical line 40 going through the point of attachment 42 essentially bisects the arc defined by the aperture 36. Thus the arm 30 could be easily moved from a first configuration, as shown in FIG. 7, with the arm 30 being inclined in a first direction, to a second configuration, as shown in FIG. 7A, with the arm 30 being inclined in a second direction. This is merely another example of the variety of options that may be used to create a belt conveyor with a side skirt that can create a seal with or make floating contact with the belt regardless of the direction of movement of the belt.

Figure 8:
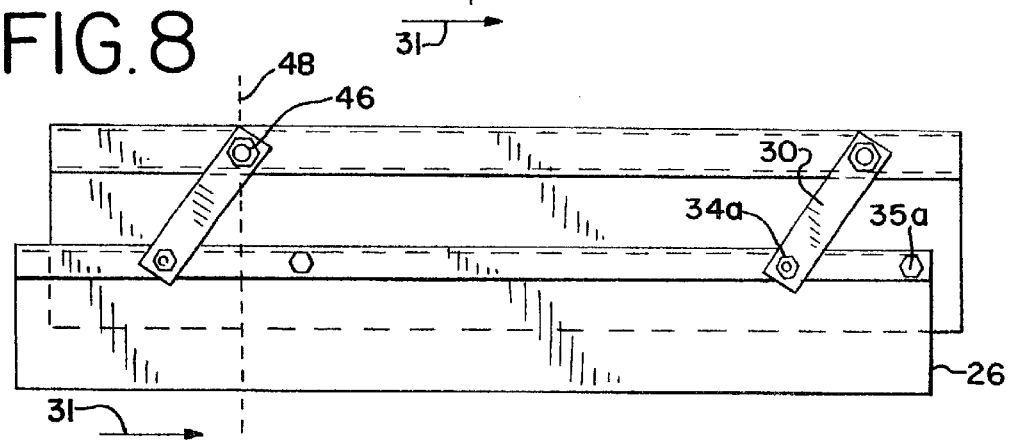
FIGS. 8 and 8A are respective views of still another embodiment of the present invention with the arms in the pressure and floating positions.
Figure 8A:
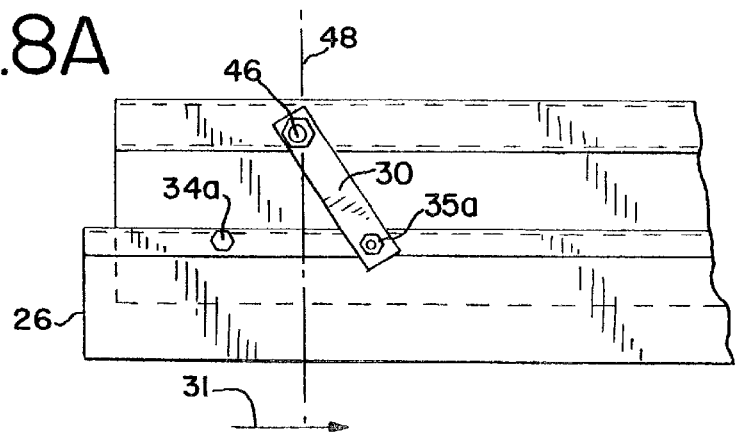

FIGS. 8 and 8A portray still another embodiment of the present invention where the multiple points of attachment are located on the spacer member 32. The vertical axis line passing through the upper pivot point 46 then essentially bisects the line extending between lower pivot points 34a and 35a. With the direction of the conveyor belt moving in the direction of the arrow 31, the inclination of arms 30 in FIG. 8 places the skirt 26 in a pressure mode while the inclination in FIG. 8A places the skirt in a floating mode.

From a reading of the above with the appended drawings, it should be understood that variations and changes may be made by those with ordinary skills in the art without departing from the scope of the claims herein.

What is claimed is:

1. A skirt mechanism for use with a conveyor having a belt and a side wall including a lower edge positioned proximate to an edge of the belt, said skirt mechanism comprising:
   at least one arm having a first end and a second end, said arm adapted to be pivotally connected at said first end to the side wall; and
   a skirt adapted to contact the belt, said second end of said arm being pivotally connected to said skirt at one of either a first attachment point or a second attachment point, said arm adapted to be inclined in a first direction when attached to said first attachment point and adapted to be inclined in a second direction when attached to said second attachment point, thereby permitting a pressure seal or floating contact to be maintained between said skirt and the belt irrespective of the direction of movement of the belt with respect to said skirt.

2. The skirt mechanism of claim 1 including a spacer member adapted to pivotally attach said first end of said arm to the sidewall.

3. The skirt mechanism of claim 1 including a spacer member adapted to pivotally attach said second end of said arm to said skirt.

4. The skirt mechanism of claim 1 wherein said arm comprises a rigid member.

5. A skirt mechanism for use with a conveyor having a belt and a side wall including a lower edge positioned proximate to an edge of the belt, said skirt mechanism comprising:
   first and second attachment points adapted to be associated with the side wall;
   at least one arm having a first end and a second end, said arm adapted to be pivotally connected at said first end to one of either said first attachment point and second attachment point; and
   a skirt adapted to contact the belt, said second end of said arm being pivotally connected to said skirt, said arm adapted to be inclined in a first direction when attached to said first attachment point and adapted to be inclined in a second direction when attached to said second attachment point, thereby permitting a pressure seal or floating contact to be maintained between said skirt and the belt irrespective of the direction of movement of the belt with respect to said skirt.

6. The skirt mechanism of claim 5 including a spacer member adapted to pivotally attach said first end of said arm to the sidewall.

7. The skirt mechanism of claim 5 including a spacer member adapted to pivotally attach said second end of said arm to said skirt.

8. The skirt mechanism of claim 5 wherein said arm comprises a rigid member.

9. A skirt mechanism for use with a conveyor having a belt and a side wall including a lower edge positioned proximate to an edge of the belt, said skirt mechanism comprising:
   at least one arc-shaped point of attachment adapted to be associated with the side wall;
   at least one arm having a first end and a second end, said arm adapted to be pivotally connected at said first end to any point within said arc-shaped aperture; and
   a skirt adapted to contact the belt, said second end of said arm being pivotally connected to said skirt, said arm adapted to be inclined in a first direction when attached to a first point within said arc-shaped aperture and adapted to be inclined in a second direction when attached to a second point within said arc-shaped aperture, thereby permitting a pressure seal or floating contact to be maintained between said skirt and the belt irrespective of the direction of movement of the belt with respect to said skirt.

10. The skirt mechanism of claim 9 including a spacer member adapted to be attached to the side wall, said spacer member including said arc-shaped aperture, said first end of said arm being pivotally connected to said spacer member at a point within said arc-shaped aperture.

11. The skirt mechanism of claim 9 including a spacer member adapted to pivotally attach said second end of said arm to said skirt.

12. The skirt mechanism of claim 9 wherein said arm member comprises a rigid member.

13. A skirt mechanism for a conveyor having a conveyor belt including an edge, said skirt mechanism including:
   a mounting member adapted to be located adjacent and above an edge of the conveyor belt;
   at least one skirt pivotally connected at multiple locations to said mounting member and located above the conveyor belt and adjacent the edge thereof;
   a rigid first arm member having a first end pivotally connected to said mounting member and a second end pivotally connected to said skirt;
   a rigid second arm member having a first end pivotally connected to said mounting member and a second end pivotally connected to said skirt;
   whereby when the conveyor belt is traveling in a first direction with respect to said skirt said skirt operates in floating contact with the conveyor belt and when the conveyor belt is traveling in a reverse second direction with respect to said skirt said first and second arms operate as pressure arms creating a pressure seal between said skirt and the conveyor belt.

14. The skirt mechanism of claim 13 including first and second alternate mounting points on said mounting member laterally spaced to provide alternate mounting positions between said first arm and said mounting member.

15. The skirt mechanism of claim 14 including third and fourth alternate mounting points on said mounting member laterally spaced to provide alternate mounting positions between said second arm and said mounting member.

16. The skirt mechanism of claim 14 wherein said mounting member includes an elongate slot, said first and second alternate mounting points being located within said slot.

17. The skirt mechanism of claim 16 wherein said slot is arc-shaped.

18. The skirt mechanism of claim 13 including first and second alternate mounting points on said skirt laterally spaced to provide alternate mounting positions between said first arm and said skirt.

19. The skirt mechanism of claim 18 including third and fourth alternate mounting points on said skirt laterally spaced to provide alternate mounting positions between said second arm and said skirt.

20. The skirt mechanism of claim 13 wherein said mounting member comprises a side wall.

21. The skirt mechanism of claim 13 wherein said mounting member comprises a spacer member.

* * * * *